(12) United States Patent
Lehmann et al.

(10) Patent No.: US 7,545,505 B2
(45) Date of Patent: Jun. 9, 2009

(54) DEVICE AND METHOD FOR A COMBINED INTERFEROMETRY AND IMAGE-BASED DETERMINATION OF GEOMETRY, ESPECIALLY FOR USE IN MICRO SYSTEM ENGINEERING

(75) Inventors: Peter Lehmann, Göttingen (DE); Norbert Steffens, Überherrn (DE)

(73) Assignee: Carl Mahr Holding GmbH, Göttingen (DE)

( * ) Notice: Subject to any disclaimer, the term of this patent is extended or adjusted under 35 U.S.C. 154(b) by 232 days.

(21) Appl. No.: 11/585,621

(22) Filed: Oct. 24, 2006

(65) Prior Publication Data

US 2007/0035744 A1    Feb. 15, 2007

Related U.S. Application Data

(63) Continuation-in-part of application No. PCT/EP2005/004795, filed on May 3, 2005.

(30) Foreign Application Priority Data

May 4, 2004    (DE) ................... 10 2004 022 341

(51) Int. Cl.
*G01B 9/02* (2006.01)
(52) U.S. Cl. ........................ 356/497; 356/73
(58) Field of Classification Search ............. 356/497, 356/73, 479
See application file for complete search history.

(56) References Cited

U.S. PATENT DOCUMENTS

| | | | |
|---|---|---|---|
| 5,042,949 A | 8/1991 | Greenberg et al. | |
| 5,112,129 A | 5/1992 | Davidson et al. | |
| 5,459,564 A | 10/1995 | Chivers | |
| 5,471,303 A * | 11/1995 | Ai et al. | 356/497 |
| 5,715,061 A | 2/1998 | Fujiwara | |
| 6,172,349 B1 | 1/2001 | Katz et al. | |
| 6,769,769 B2 * | 8/2004 | Podoleanu et al. | 351/221 |

* cited by examiner

*Primary Examiner*—Hwa (Andrew) S Lee
(74) *Attorney, Agent, or Firm*—R. S. Lombard; K. Bach

(57) ABSTRACT

The apparatus according to the invention comprises an object lens which can operate in at least two different measuring modes. In a first, interference mode a workpiece is measured by means of interference optometry. In a second, imaging measuring mode an optical image is produced, for example, on a camera-like detector array and may be applied to an image processing routine. Switching between the two measuring modes is performed by the type of illumination of the object lens and an element which is disposed preferably in the reference beam path of an interferometer and which activates or deactivates the reference beam path dependent on the spectral composition of the utilized light. In this manner a simple and rapid changeover between the two measuring modes is provided, without the need for replacing or even for moving the object lens. Apart from the rapidity of changeover, a good correlation is achieved between the measuring data which are yielded by the interferometry and by the image processing and which are obtained in one and the same reference coordinate system.

18 Claims, 5 Drawing Sheets

DEVICE AND METHOD FOR A COMBINED INTERFEROMETRY AND IMAGE-BASED DETERMINATION OF GEOMETRY, ESPECIALLY FOR USE IN MICRO SYSTEM ENGINEERING

CROSS-REFERENCE TO RELATED APPLICATION

This is a continuation-in-part application of international application PCT/EP2005/004795 filed May 3, 2005, and claiming the priority of German application 10 2004 022 341.6 filed May 4, 2004.

BACKGROUND OF THE INVENTION

The invention relates to an apparatus and a method for a combined two-dimensional detection of height magnitudes of a workpiece. The apparatus and the method are adapted particularly for measuring tasks in the micro system technology.

For optically measuring height structures with the greatest accuracy even in case of stepped workpieces, the vertically scanning white light interferometry (WLI) has been found to be adapted. The usual interferometric arrangements therefor are the Michelson interferometer, the Linnik interferometer and the Mirau interferometer. In the WLI a white light source, typically a halogen lamp is used for illumination. During measurement, the optical path length difference between the measuring beam and the reference beam is continuously increased or decreased, while at distances of less than 100 nm interference images of the workpiece are reproduced, generally with a two-dimensionally resolving pixel sensor (for example, a CCD or a CMOS array). The optical path length change may be effected by a motion of the workpiece in the direction of the interferometer, a motion of the interferometer toward or away from the workpiece, a motion of the interference object lens or a motion of a reference mirror. This process is designated as "vertical scanning". The intensity course dependent on the optical path length difference for each camera pixel, the so-called Corellogram, is applied to a further signal evaluation.

In the WLI signal evaluation, a distinction is made between the coherence peak evaluation which yields a relatively coarse estimation of the height location of a measuring point with deviations of partially over 100 nm and the phase evaluation which permits measuring uncertainties in the nanometer or sub-nanometer range. The height measuring range may amount to several millimeters.

Lateral geometric features of workpieces may be determined by means of a digital evaluation of pixel images. For microscopic workpieces the measuring microscope is provided with suitable cameras for reproducing such pixel images and for subsequently evaluating them. An advantage of such a process resides in the high measuring speed which makes also possible, during a corresponding synchronization between the image capture and the arrangement of the workpiece, examinations of the dynamic behavior of corresponding workpieces. All microscopic processes are, however, subject to limitations as concerns the attainable lateral resolution because of the deflection-limited imaging. When using visible light, this generally leads to minimum lateral resolutions of about 0.5 μm.

In case the evaluation of lateral structures base on digitalized light microscopic captures is to be performed by one of the above-noted interferometric arrangements, the interference effects necessarily appearing in the interference microscopy have an adverse effect because of the additional image contrasts conditioned thereon. In the presently known systems at least a replacement of the object lens is required to be able to perform measurements based on white light interferometric and image processing. The exact correlation, however, between the height position determined with the white light interferometry and a light microscopic image captured with limited depth sharpness becomes lost. A further drawback resides in the expenses of the additional object lens and an object lens turret which may be required for an automatic changeover between the two measuring modes.

It is the object of the invention to provide assistance in this connection.

SUMMARY OF THE INVENTION

The apparatus according to the invention comprises an object lens which can operate in at least two different measuring modes. In a first, interference mode a workpiece is measured by means of interference optometry. In a second, imaging measuring mode an optical image is produced, for example, on a camera-like detector array and may be applied to an image processing routine. Switching between the two measuring modes is performed by the type of illumination of the object lens and an element which is disposed preferably in the reference beam path of an interferometer and which activates or deactivates the reference beam path dependent on the spectral composition of the utilized light. In this manner a simple and rapid changeover between the two measuring modes is provided, without the need for replacing or even for moving the object lens. Apart from the rapidity of changeover, a good correlation is achieved between the measuring data which are yielded by the interferometry and by the image processing and which are obtained in one and the same reference coordinate system.

In the apparatus and the method according to the invention at least two measuring modes are available, that is, an interferometric measuring mode and an image processing mode with optical imaging of the workpiece. The changeover between the two measuring modes is effected by switching the light used for illuminating the workpiece. By light there are meant electromagnetic waves having a short wavelength. The apparatus according to the invention makes possible to provide a compact sensor module which has only a single object lens directed to the workpiece and with which interferometric measurements of vertically high resolution as well as image processing-based measurements of laterally high resolution may be performed. This is achieved by using, for the white light interferometric measurement, only one defined spectral light component to which the utilized camera is sensitive and by using another spectral component for the pure image processing. In the light microscopic measuring mode, for example, a blue LED (light emitting diode) may be active in the illuminating beam, and for the white light interferometry a white light LED may be provided. In the white light interferometric mode the blue LED is switched off and the white light LED is active. In this manner, with small outlay, a light microscopic measurement, as well as an interferometric measurement may be performed in the same reference system, in each instance with optimized accuracy. By virtue of light microscopic "scanning" with subsequent interferometric measurement, the possibility is further provided to obtain rapid automatic measuring processes. Furthermore, in the light microscopic measuring mode a rapid verification of the dynamic behavior of the examined workpiece or system may be performed.

Preferably a Mirau interference object lens with integrated beam splitting plate and integrated reference mirror is used as an object lens. The reflecting light illumination in the white light interferometric measuring mode is performed with a short-coherent light source, such as a white light LED, or a suitable color filter, whose spectrum, for example, extends over a wavelength range of greater than 150 nm, above 500 nm. Supplementally a blue LED finds application which emits at about 450 nm and whose light is used exclusively for imaging the workpiece, that is, for this part of the wavelength spectrum no light is admitted from the reference beam to the detector matrix. According to a possible embodiment, the reference mirror is designed as a long-pass filter (such as a dichroic layer with an after-connected absorber).

The light-microscopic image captured, for example, by blue light, serves for the lateral detection of geometric elements with high resolution. Based only on the small wavelength of the blue light, lateral resolutions of less than 0.5 μm may be obtained. With the aid of an external light source on the basis of blue LED's, for example, a segment-wise controllable annular light illumination, in the image processing mode measurements may be taken even on inclined reflecting flanks without the need for tilting the workpiece which is a costly procedure.

By applying the approach to the Michelson object lens too, larger measuring ranges may be detected with one measuring process (at a reduced lateral resolution corresponding to the smaller numeric aperture). On the other hand, the Linnik arrangement is expedient for minimizing the lateral resolution, by selecting a possibly large numeric aperture for the object lens. It is further feasible to utilize several object lenses, for example, by means of an object lens turret provided in the apparatus.

According to an aspect of the invention, the interferometric arrangement may also function as a phase shifting interferometer. In such a case an approximately monochromatic light source is utilized for the interferometric measurements.

The additional provision of a tactile micro scanner in the field of sight of the microscope ensures that even on structures which are inaccessible for the optical measuring, geometric measuring data may be determined. The tactile measurement is performed in this instance based on the mechanical coupling with the optical apparatus in the same reference system as the interferometric measurement and the image processing. The tactile micro scanner may be, for example, a silicon flexion bar provided with a piezo-resistive bridge circuit for measuring the excursions of the scanner.

The coupling of the measuring apparatus with the mechanical positioning units for the X, Y and Z axis which may be provided with suitable incremental measuring systems, allows to correlate measurements of different workpiece zones with one another. Dependent on the measuring task, rotational positioning axes too, may be expedient.

The apparatus according to the invention may be designed as a compact sensor module and makes possible a great number of applications at relatively small instrument costs, particularly in the field of micro system technology. It takes into account the continuously increasing requirements concerning the measuring accuracy and the process-oriented and flexible application possibilities. The use of LED's as light sources as opposed to the thermal beams used in the prior art white light interferometry has significant advantages as concerns freedom of configuration, compactness, life expectancy and reduction of thermal noise effects.

In the method according to the invention, the individual systems of the measuring apparatus are operated in a mutually coordinated manner such that the given measuring task is optimally solved. Lateral structural magnitudes are analyzed by image processing, height structures are detected by means of white light interferometry and further features, such as micro structures on vertical flanges are, if needed, detected by a tactile micro scanner. All measuring data are present in the same reference system and may thus be combined with one another.

BRIEF DESCRIPTION OF THE DRAWINGS

For a better understanding of the invention, reference may be made to the accompanying exemplary embodiments of the invention illustrated in the drawings, in which.

DESCRIPTION OF THE PREFERRED EMBODIMENTS

Figure 1:
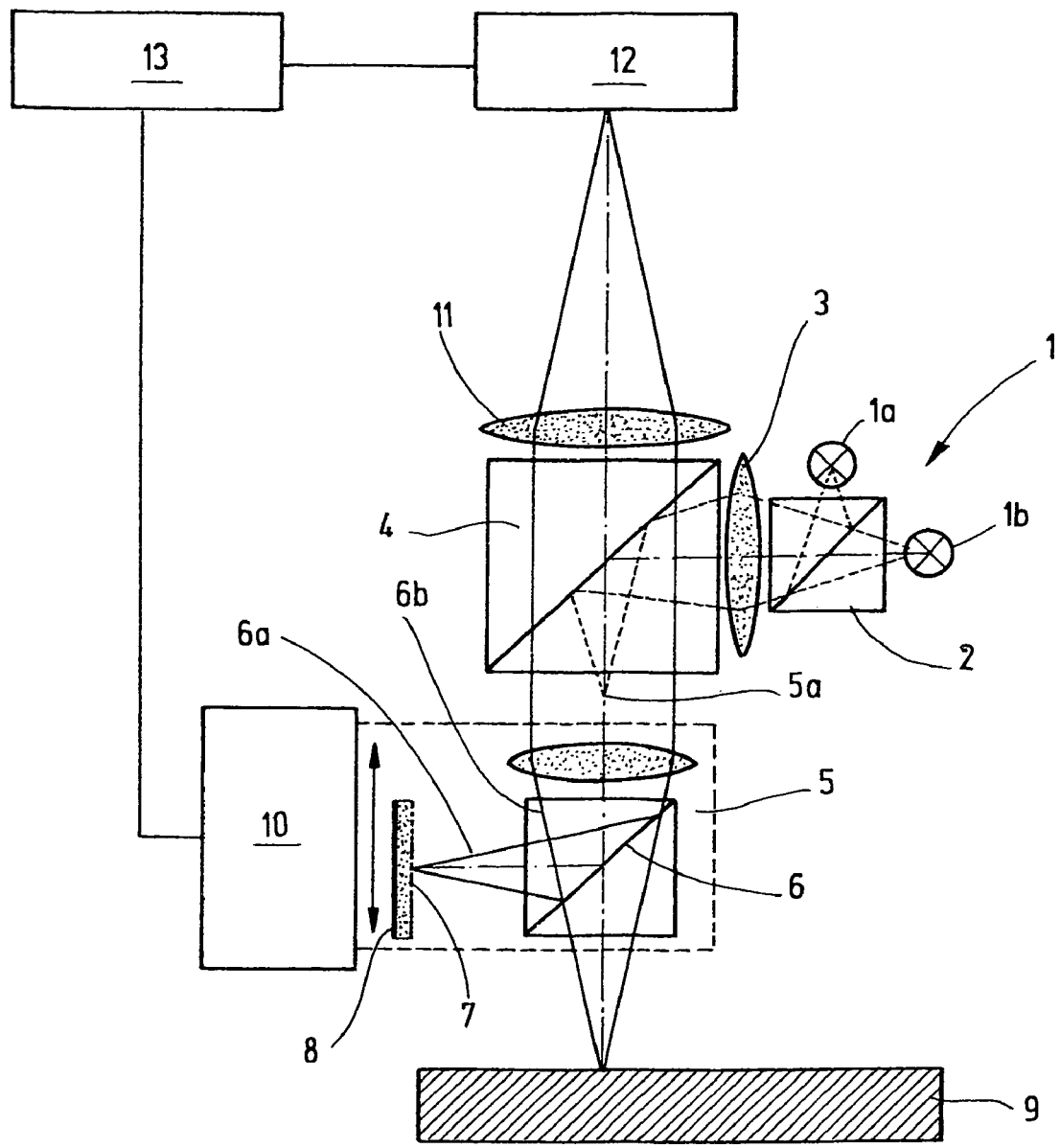
FIG. 1 is a basic illustration of an apparatus according to the invention, based on a Michelson interferometer.

FIG. 1 illustrates an apparatus for a combined two-dimensional detection of height magnitudes of a workpiece 9, alternatively in an interferometric measuring mode and in an image processing mode by means of an optical imaging of the workpiece 9. The apparatus includes an arrangement for a reflecting light illumination of the workpiece 9. The apparatus comprises two light sources 1a, 1b with an optical system connected thereto for directing the light onto the workpiece. The light sources 1a, 1b emit light having different spectral compositions. For example, the light source 1a is a light emitting diode (LED) emitting blue light, that is, a short-wave beam. The light source 1b is, for example, a white light LED which generates a relatively wide light spectrum. The light sources 1a, 1b are reproduced, for example, by a dichroic beam splitter 2, a condenser 3 and a further beam splitter 4 on the inlet pupil 5a of an object lens 5, including an integrated beam splitter 6, a reference mirror 7 and an absorber 8. In the interferometric measuring mode, one part of the white or yellow light of the light source 1b exiting laterally from the object lens is guided by the beam splitter 6 to the reference mirror 7 and is reflected by the latter. Another part of the white or yellow light exiting from the object lens 5 is guided by the beam splitter 6 to the workpiece 9 and reflected by the latter. The reference mirror 7 and the part of the workpiece 9 situated within the sharpness depth are reproduced by the object lens 5 and a barrel lens 11 on a detector array 12, such as a pixel camera having 800×600 pixels. The light reflected by the workpiece 9 and the mirror 7 is brought together by the beam splitter 6; it traverses the beam splitter 4 and impinges on the detector array 12 for interference.

A positioning unit 10 serves for adjusting the object lens 5 perpendicularly to the workpiece 9, that is, in the Z direction. A digital computer 13, serving as a control device, receives the images delivered by the detector array 12 and controls the positioning unit 10. The interferometric measurement is effected by moving the object lens 5 by means of the positioning unit 10 along the optical axis, while interference images are reproduced and evaluated in the digital computer 13 for the different height positions of the object lens. The light source 1b (white light source) is active in the interference operation. The light source 1a (blue LED) is inoperative in the interference mode.

In the image processing mode, the light source 1a (blue LED) is activated and the light source 1b (white light LED) is de-activated. One part of the blue light is admitted in the reference beam 6a, but passes through the reference mirror 7 and is absorbed by an absorber 8 situated there behind, so that it is not admitted back into the imaging beam 6b. The reference mirror 7 and the absorber 8 thus form a frequency-selective switching element which, dependent on the spectrum delivered by the light sources 1a, 1b, switches the reference beam 6a actively or passively and thus distinguishes between the interference mode and the imaging mode. In the alternative or in complementation, the beam splitter 6 too, may be designed as a frequency-selective switching element, so that it acts for the light in the interference operation as a beam splitter, but acts for the light in the image processing mode in a purely transmitting manner.

The substantial part of the blue light illuminates the workpiece 9 and serves, in conjunction with the barrel lens 11, for the image reproduction, on the detector array 12, of the workpiece zones situated within the sharpness depth of the object lens 5. The latter reproduces the images of the workpiece and applies them to the digital computer 13 for the after-connected digital evaluation.

In the interferometric measuring mode it is feasible to operate, for example, in accordance with one of the known processes in conjunction with the white light interferometry for determining the height positions of structures of the workpiece 9. For example, the positioning unit 10 is adjusted until interference phenomena appear and then the latter are evaluated.

In the image processing mode, on the other hand, the workpiece illuminated by blue light is optically reproduced on the detector array 12. The obtained image may be further processed by the digital computer 13. For example, by means of edge-finding routines, image structures may be recognized and measured.

Figure 2:
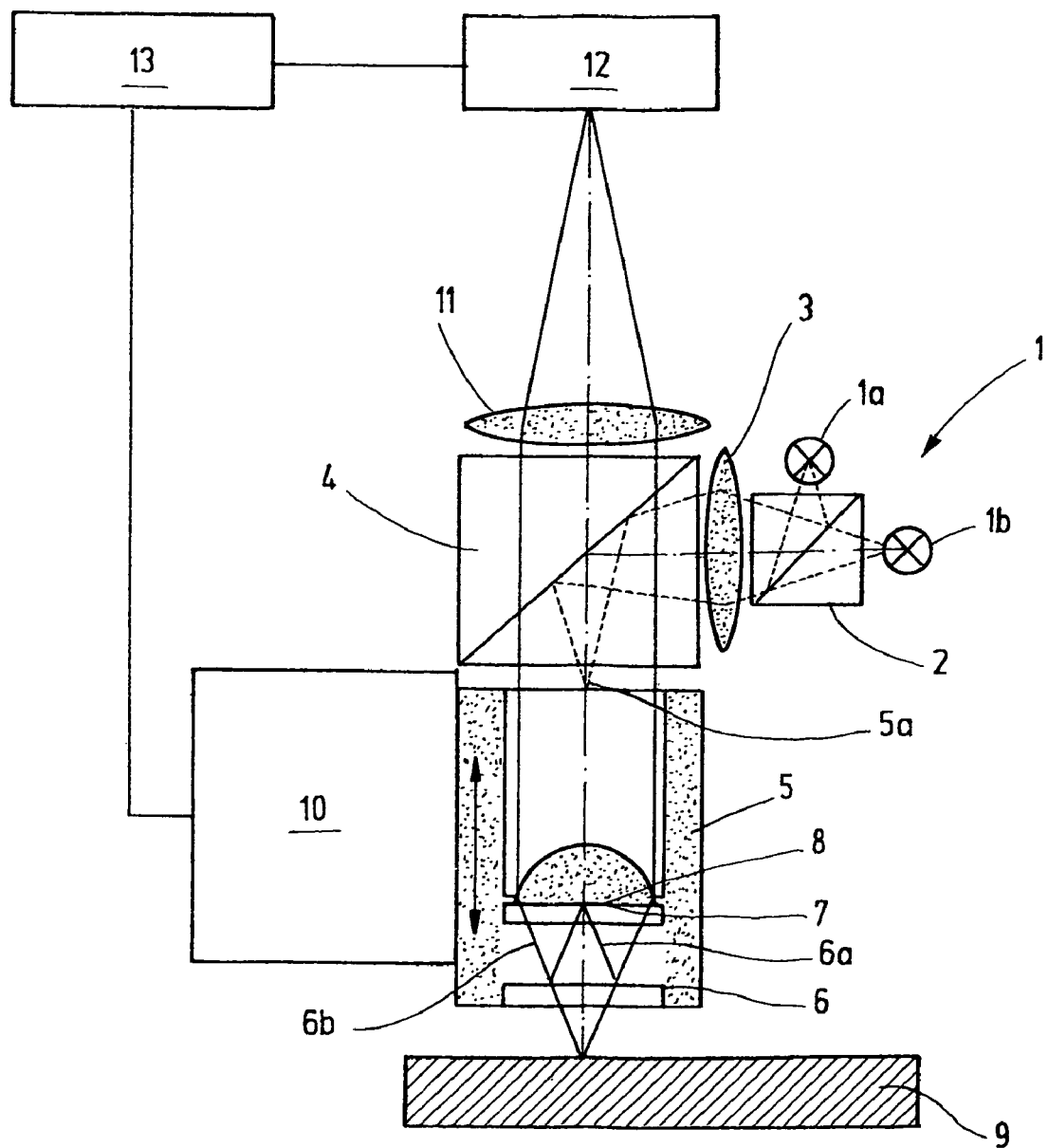
FIG. 2 is a basic illustration of an apparatus according to the invention, based on a Mirau interferometer.

FIG. 2 illustrates the Mirau interferometer structured according to the invention and also designed for performing the method according to the invention. The earlier description applies as concerns the same reference characters. The beam splitter 6 is designed as a partially reflecting plate. The reference mirror 7 and the absorber 8 are arranged on the optical axis. As in the precedingly described interferometer of FIG. 1 according to the Michelson principle, here too, the reference mirror 7 and the optical absorber 8 constitute a switch-over device dependent on the frequency of light, that is, eventually on a filter, by means of which switching between the different measuring modes is effected dependent on the spectral characteristics of the light sources 1a, 1b. The thus-structured filter may perform, in all the described embodiments, a long-pass filtering, a short-pass filtering, a band-pass filtering or a band-blocking filtering in the reference beam of the interferometric measuring arrangement. Here too, the filtering action may be alternatively or complementally obtained by the corresponding, wavelength-selective design of the beam splitter 6.

Figure 3:
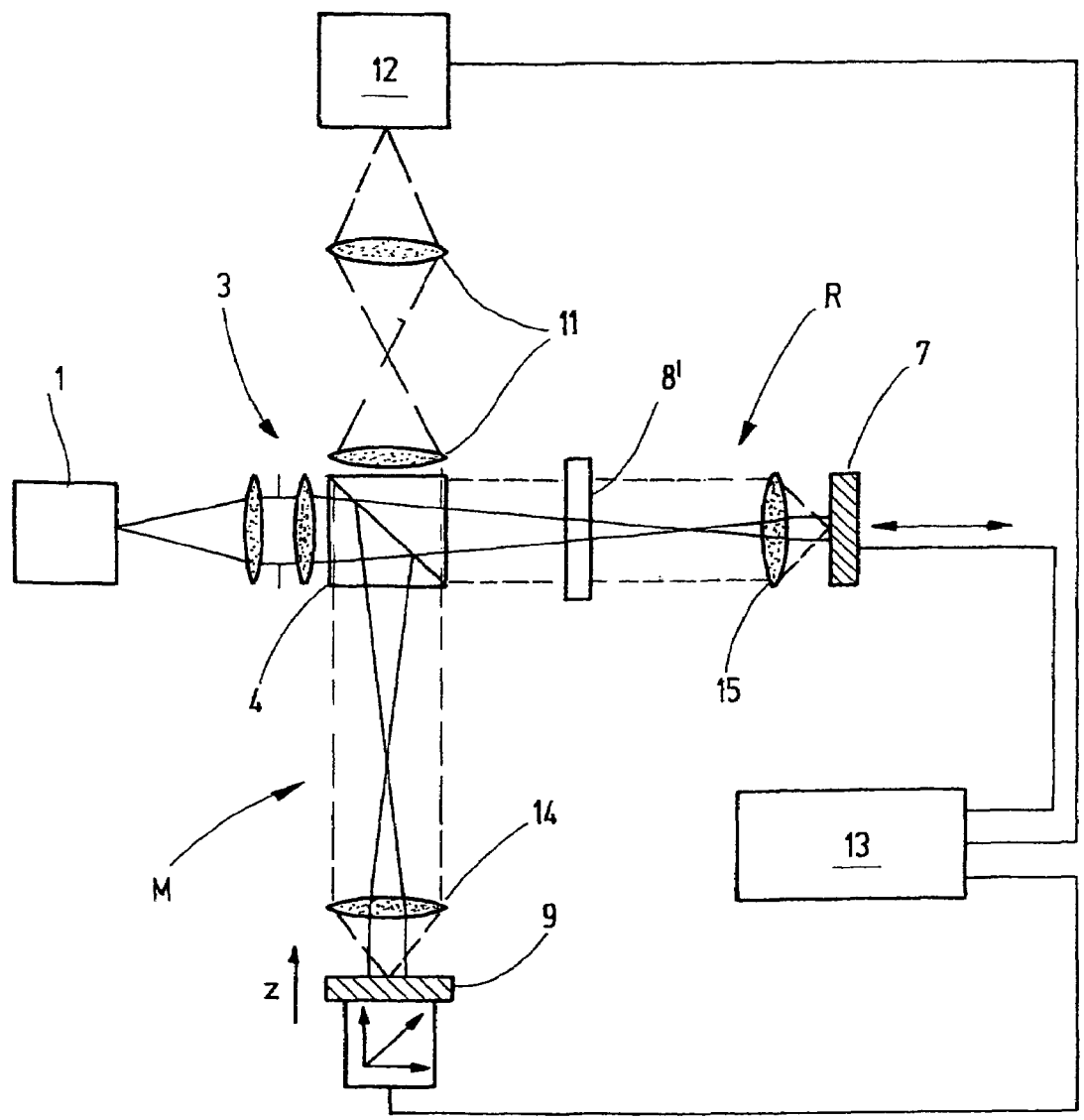
FIG. 3 is a basic illustration of an apparatus according to the invention, based on a Linnik interferometer.

FIG. 3 shows an apparatus according to the invention, having two measuring modes based on a Linnik interferometer. The latter has, in addition to the earlier described and identically referenced components, both in the measuring beam path M and in the reference beam path R, object lenses 14, 15 which provide for a large numeric aperture. In this manner the lateral resolution is minimized.

In the reference beam path R again a mirror 7 may be used which is connected with an absorber and which is transparent for the light used in the image processing mode. It is, however, also feasible to use a color filter 8' which is disposed in the reference beam path R and which is opaque for the light used in the image processing mode. For a changeover between interference mode and image processing mode, again a light source is used which may be affected in its spectral composition and which is thus switchable.

With the Linnik interferometer according to FIG. 3, phase-shifting interferometry may also be performed. For this purpose, the mirror 7 may be adjusted parallel to the optical axis of the reference light path by means of a suitable setting device, such as a piezo setting device. The adjustment of the reference mirror 7 is effected by the digital computer 13 which furthermore evaluates the interference images reproduced on the detector array 12. It is feasible to perform phase-shifting interferometry by means of the short-coherent light delivered in the interferometric measuring mode by the measuring light 1b, generated, for example, by a white light diode. It is, however, preferred to use for this purpose a longcoherent light emanating, for example, from a laser diode.

Figure 4:
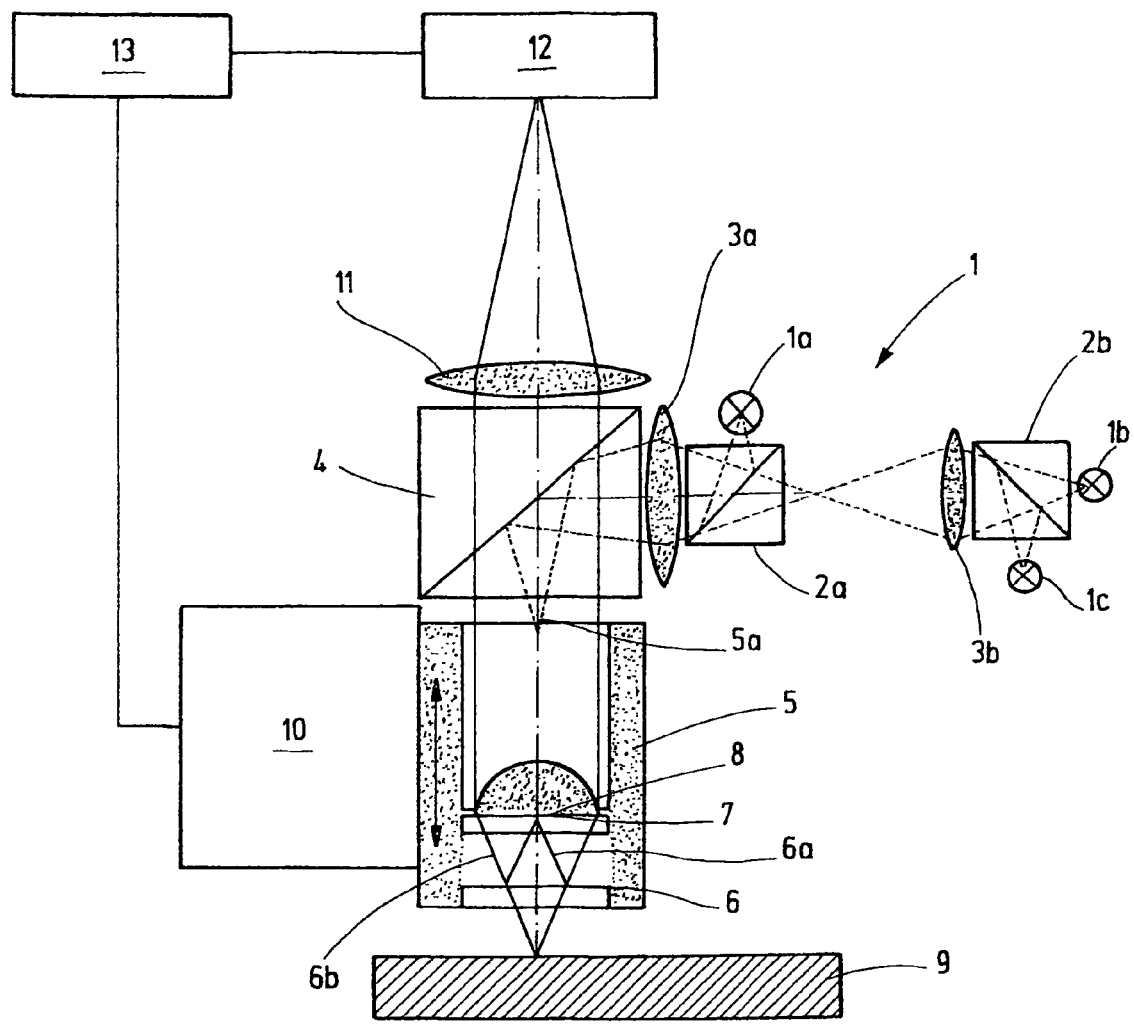
FIG. 4 shows an apparatus according to the invention based on a Mirau interferometer and providing for three measuring modes; and, FIG. 5 is a basic illustration of a measuring apparatus according to FIG. 1 provided with an additional mechanical scanner.

FIG. 4 illustrates a light source which delivers three different light qualities, that is, light for the optical image processing mode by means of a narrow-band light source 1a, short-coherent light for the white light interferometry by means of a light source 1b, as well as long-coherent light, for example, from a laser diode for performing a phase-shifting interferometry, by means of a light source 1c. This light source 1 may find application in each of the precedingly described interferometers. In FIG. 4 this is illustrated in the example of a Mirau interferometer. The launching of the light beams generated by the three light sources 1a, 1b, 1c is effected by corresponding, for example, dichroic beam splatters 2a, 2b, as well as condenser lenses 3a, 3b. While the operation of the apparatus by means of the light sources 1a, 1b, that is, in the image processing mode and in the (short-coherent) interferometric measuring mode proceeds in accordance with the description in conjunction with FIGS. 1 and 2, it is feasible in addition to perform a phase-shifting interferometry if the long-coherent light source 1c is activated. In the present example, this may occur by adjusting the object lens 5 by means of the positioning unit 10 which changes the length of the measuring light path, while the length of the reference light path 6a remains constant.

In the alternative, a Linnik interferometer according to FIG. 3 may also find application, whose light source 1 encompasses the three light sources 1a, 1b, 1c and in which the reference mirror 7 is used for phase shifting. In the alternative, the Michelson interferometer according to FIG. 1 may also be used, in which case then the reference mirror 7 is adjustable by means of a non-illustrated positioning unit.

The apparatus and the method according to the invention are designed for the combined two-dimensional detection of height values of a workpiece by means of interferometry (interferometric measuring mode) and for measuring lateral dimensions of geometric elements by reproducing and digitally evaluating optical imaging of the workpiece (image processing mode). For this purpose, an object lens is used which, in one part of the spectrum of the electromagnetic waves, acts as an interference object lens and for another part of the spectrum effects a pure optical imaging of the workpiece. Thus, by changing the spectral composition of the light utilized as a reflective illumination, the interferometric measuring mode may be changed to the image processing mode.

As an interference generating object lens, an arrangement according to Michelson, Mirau or Linnik may be used. LED's of different colors may be used as light sources for the two measuring modes. A blue LED may be utilized as the light source for the image processing mode. The selection of the different measuring modes may be effected by the spectral characteristics of the light source by means of a long-pass, short-pass, band-pass and/or a band-blocking filtering in the reference beam path of the interferometric measuring arrangement. In the interferometric measuring mode a short-coherent light source, such as a white light LED may be used, so that measurements based on the vertically scanning white light interferometry may be performed. In addition, an interferometric measuring mode may be provided in which a coherent light source is utilized, so that measurements based on the phase-shifting interferometry may be performed.

In the interferometric measuring mode a short-coherent light source may be used, so that measurements based on the vertical white light interferometry may be performed, while, in the alternative to the short-coherent light source, a coherent light source is used which emits light in the spectral range intended for interferometric measurements. Thus, in a third measuring mode, measurements based on phase-shifting interferometry may be performed.

Figure 5:
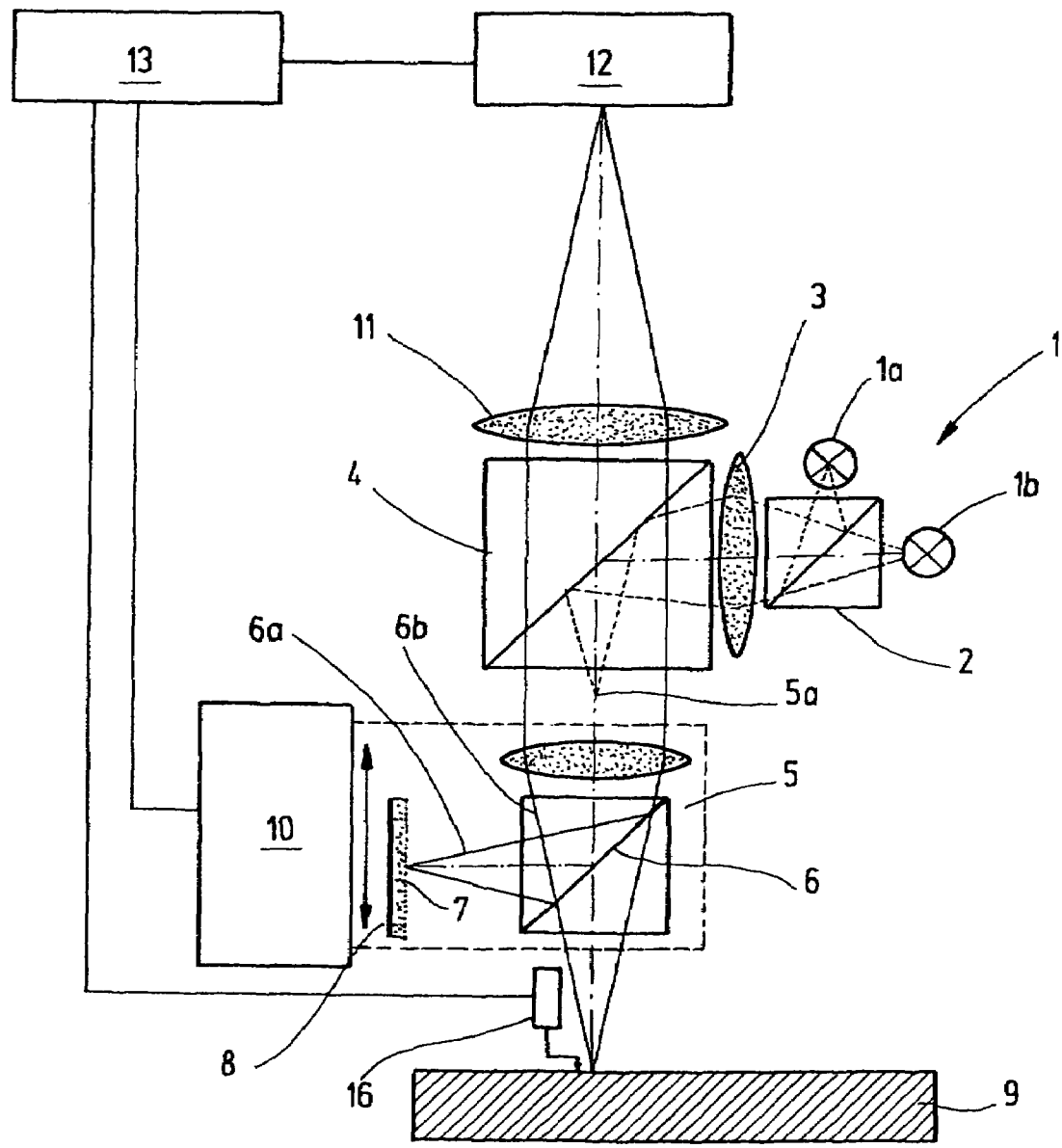

In addition, a scanner 16 measuring in a dot-like manner may be brought into the field of sight of the imaging optical system. Such an embodiment, illustrated in FIG. 5, is based on a Michelson interferometer. In the alternative, corresponding dot-like measuring scanners 16 may also be brought into the apparatuses according to FIGS. 2 to 4. The scanner 16 measuring in a dot-like manner is preferably connected with the digital computer 13.

A change in the relative position between the workplace and the measuring instrument may be effected by means of translatory and/or rotary adjusting devices, that is, axes which are associated with the workpiece 9 and/or the apparatus, particularly with the object lens 5.

The apparatus according to the invention comprises an object lens which can operate in at least two different measuring modes. In a first, interference mode a workpiece 9 is measured by means of interference optometry. In a second, imaging measuring mode an optical image is produced, for example, on a camera-like detector array and may be applied to an image processing routine. Switching between the two measuring modes is performed by the type of illumination of the object lens and an element which is disposed preferably in the reference beam path of an interferometer and which activates or deactivates the reference beam path dependent on the spectral composition of the utilized light. In this manner a simple and rapid changeover between the two measuring modes is provided, without the need for replacing or even for moving the object lens. Apart from the rapidity of changeover, a good correlation is achieved between the measuring data which are yielded by the interferometry and by the image processing and which are obtained in one and the same reference coordinate system.

What is claimed is:

1. An apparatus for the combined two-dimensional detection of height values of a workpiece (9) by interferometry in an interferometric measuring mode and by reproduction and digital evaluation of optical images of the workpiece (9) to measure lateral dimensions of geometric elements in an image processing non-interferometric measuring mode said apparatus including, means for illumination by reflecting light off the workpiece (9) and for altering the spectral composition of the light used for the reflective illumination, an interferometer disposed in the path of said reflecting light, said interferometer including means for activating or deactivating a reference beam path dependent on the spectral composition of said reflecting light, means is for acting as an interference object lens for one part of the spectrum of electromagnetic waves and for acting as an optically imaging object lens for another part of the spectrum of electromagnetic waves, whereby altering the spectral combination of the light used for reflective illumination, the interferometric measuring mode may be changed to the image processing non-interferometric measuring mode.

2. The apparatus as defined in claim 1, wherein the means for reflective illumination emits at least two different light types of unlike spectral composition.

3. The apparatus as defined in claim 1, wherein the means for reflective illumination includes a switchover light source.

4. The apparatus as defined in claim 1, wherein the means for reflective illumination includes at least two alternative light sources (1a, 1b).

5. The apparatus as defined in claim 4, wherein the light sources (1a, 1b) are LED's having different colors.

6. The apparatus as defined in claim 4, wherein a blue LED is provided as a light source (1a) for the image processing mode.

7. The apparatus as defined in claim 4, wherein a short-coherent light source is provided as a light source (1b) for the interferometric measuring mode.

8. The apparatus as defined in claim 7, wherein the interferometer is a white light interferometer.

9. The apparatus as defined in claim 8, wherein a positioning unit (10) is associated with the interferometer, at least one of the means for acting as an interference object lens for one part of the spectrum of electromagnetic waves and for acting as an optically imaging object lens for another part of the spectrum of electromagnetic waves and the workpiece (9), for performing a vertically scanning interferometry.

10. The apparatus as defined in claim 7, wherein the means for reflective illumination desirably includes a third alternative light source, a long-coherent light source (1c).

11. The apparatus as defined in claim 10, wherein the interferometer further comprises a phase shifter (7, FIG. 3), whereby a third measuring mode based on phase shifting interferometry is provided.

12. The apparatus as defined in claim 1, further comprising a scanner (16) for measuring in a dot-like manner, is disposed in the field of sight of the apparatus.

13. The apparatus as defined in claim 12, wherein the scanner (16) is a mechanical scanner.

14. The apparatus as defined in claim 1, further comprising positioning unit 10 for adjusting the apparatus and the workpiece (9) relative to one another.

15. A method for the combined two-dimensional detection of height values of a workpiece (9) by means of interferometry in an interferometric measuring mode and for measuring lateral dimensions of geometric elements in an image processing non-interferometric mode by means of reproducing and digitally evaluating optical images of the workpiece, said method comprises: using an object lens (5) as an interference object lens in the interference measuring mode for one part of the spectrum of electromagnetic waves and using object lens (5) in the image processing non-interferometric mode to produce a purely optical imaging for another part of the spectrum of electromagnetic waves, whereby altering the spectral combination of the light used for reflective illumination, the interferometric measuring mode may be changed to the image processing measuring mode.

16. The method as defined in claim 15, wherein at least one of the interferometer, the object lens (5), and the workpiece (9) may be displaced by means of a positioning unit (10) for performing a vertically scanning interferometry.

17. The method as defined in claim 15, wherein a third measuring mode, phase shifting interferometry is performed by means of an additionally provided, long-coherent light source (1*c*).

18. The method as defined in claim 15, wherein the workpiece (9) is scanned with a scanner (16) which measures in a dot-like manner and which is disposed in the field of sight of the apparatus.

* * * * *